(12) United States Patent
Baniamerian et al.

(10) Patent No.: US 12,388,752 B2
(45) Date of Patent: Aug. 12, 2025

(54) SYSTEM AND METHOD FOR A SCALABLE SOURCE NOTIFICATION MECHANISM FOR IN-NETWORK EVENTS

(71) Applicant: HUAWEI TECHNOLOGIES CO., LTD., Shenzhen (CN)

(72) Inventors: Amir Baniamerian, Gatineau (CA); Xingjun Chu, Ottawa (CA); Yashar Ganjali, North York (CA); Ali Munir, Kanata (CA); Ashkan Sobhani, Kanata (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 64 days.

(21) Appl. No.: 17/727,373

(22) Filed: Apr. 22, 2022

(65) Prior Publication Data

US 2023/0344768 A1   Oct. 26, 2023

(51) Int. Cl.
*H04L 47/12* (2022.01)
*H04L 47/24* (2022.01)
*H04L 47/25* (2022.01)

(52) U.S. Cl.
CPC .......... *H04L 47/12* (2013.01); *H04L 47/2458* (2013.01); *H04L 47/25* (2013.01)

(58) Field of Classification Search
CPC ...... H04L 47/12; H04L 47/2458; H04L 47/25
See application file for complete search history.

(56) References Cited

U.S. PATENT DOCUMENTS

| | | | | |
|---|---|---|---|---|
| 6,980,520 | B1* | 12/2005 | Erimli | H04L 47/266 370/236 |
| 7,680,139 | B1* | 3/2010 | Jones | H04L 47/50 370/230.1 |
| 2005/0276221 | A1* | 12/2005 | Olesinski | H04L 47/196 370/235 |
| 2006/0293937 | A1 | 12/2006 | Sohm et al. | |
| 2007/0008884 | A1* | 1/2007 | Tang | H04L 9/40 370/230 |
| 2007/0121511 | A1 | 5/2007 | Morandin | |
| 2015/0003245 | A1 | 1/2015 | Pressley | |
| 2016/0205026 | A1* | 7/2016 | Zhovnirnovsky | H04L 47/32 370/235 |
| 2016/0219088 | A1* | 7/2016 | Ma | H04L 65/765 |

(Continued)

FOREIGN PATENT DOCUMENTS

CN   101803313 A   8/2010

OTHER PUBLICATIONS

Z. Yu et. al., "Programmable Packet Scheduling with a Single Queue", SIGCOMM, pp. 179-193, 2021.

*Primary Examiner* — Hoang-Chuong Q Vu

(57) ABSTRACT

There is provided a method and apparatus to provide notification of change events for microburst mitigation. The method is used by a sending device and includes tracking changes in scheduled data to be sent in a traffic flow and identifying a positive change in an amount of scheduled data to be sent in the traffic flow. The sending device then marks one or more packets to be sent in the traffic flow with a notification field, and then transmits the one or more packets including the notification field. The notification field can then be used by a recipient device, for example a network element, to identify and mitigate microbursts in a proactive manner.

19 Claims, 8 Drawing Sheets

(56) References Cited

U.S. PATENT DOCUMENTS

| | | | | |
|---|---|---|---|---|
| 2017/0118108 A1* | 4/2017 | Avci | ......................... | H04L 45/36 |
| 2019/0182854 A1* | 6/2019 | Chen | ................... | H04L 47/6295 |
| 2019/0280982 A1* | 9/2019 | Shiraki | ............... | H04L 47/6255 |
| 2019/0386924 A1* | 12/2019 | Srinivasan | ............ | H04L 47/122 |
| 2020/0136982 A1* | 4/2020 | Mayer-Wolf | ....... | H04L 49/9005 |
| 2020/0236057 A1* | 7/2020 | Li | ........................... | H04L 45/74 |
| 2021/0409998 A1* | 12/2021 | Kwok | .................... | H04L 45/302 |
| 2022/0029925 A1* | 1/2022 | Gandhi | ................... | H04L 47/22 |
| 2022/0172076 A1* | 6/2022 | Kanza | .................... | G06N 3/044 |
| 2022/0210075 A1* | 6/2022 | Musleh | ................ | H04L 47/127 |
| 2023/0120429 A1* | 4/2023 | Nomura | ................ | H04L 47/22 |
| | | | | 370/328 |
| 2023/0139774 A1* | 5/2023 | Raiciu | ................ | H04L 43/0852 |
| | | | | 709/238 |

\* cited by examiner

SYSTEM AND METHOD FOR A SCALABLE SOURCE NOTIFICATION MECHANISM FOR IN-NETWORK EVENTS

CROSS-REFERENCE TO RELATED APPLICATIONS

This is the first application filed for the present disclosure.

FIELD

The present disclosure relates to the field of communication networks, and particularly to a system and method which improves network performance during microbursts.

BACKGROUND

Network events such as congestion can significantly impact network performance and efficiency. Congestion control (CC) algorithms can be designed to control long term congestion, such as congestion which is at least one round-trip time (RTT) long. These algorithms can transmit congestion notifications, either implicitly or explicitly, from switches to traffic sources.

Generally, explicit congestion notification (ECN) has been used to improve congestion control performance in networks and has shown better performance compared to implicit congestion signaling by leading to less packet retransmission. ECN is an important component of modern data center network (DCN) congestion control algorithms, such as data center transmission control protocol (DCTCP) and data center quantized congestion notification (DCQCN). ECN algorithms can invoke a marking mechanism, where each packet can be marked if it faces a long queue length in any of the switches along its path. At each switch the output queue length is monitored and if it exceeds a certain threshold, the switch executing the ECN algorithm may start marking packets before their departure. This marking may indicate that there are delays and allow sources to adjust their sending rates.

However, short-term events such as microbursts may not be handled effectively by CC algorithms. These algorithms generally rely on information passing from a switch back to the traffic source which may take an RTT. However, because microbursts last less that one RTT, the information received by the traffic source may already be outdated when it is received. Thus, microbursts can not only lead to packet loss due to buffer overflow but can also lead to a CC algorithm decreasing sending rates unnecessarily, even though the microburst has already ended and the network could handle normal traffic. Therefore, there is a need for a system and method which can more efficiently handle microbursts, to obviate or mitigate one or more limitations of the prior art.

This background information is provided to reveal information believed by the applicant to be of possible relevance to the present disclosure. No admission is necessarily intended, nor should be construed, that any of the preceding information constitutes prior art against the present invention.

SUMMARY

The present disclosure provides methods and apparatus related to traffic sources providing information proactively to switches, and switches being configured to react to this information to mitigate network events.

In one aspect, a method is disclosed which includes tracking, by a sending device, changes in scheduled data to be sent in a traffic flow and identifying, by the sending device, a positive change in an amount of scheduled data to be sent in the traffic flow. The method also includes marking, by the sending device, one or more packets to be sent in the traffic flow with a notification field, and transmitting, by the sending device, the one or more packets including the notification field. Marking the one or more packets with the notification field can also include marking the one or more packets with a priority field. The priority field may be a one-bit field indicating whether the packet is a high priority packet. The notification field may be a one-bit field. Marking one or more packets may include marking a number of packets to be sent in the traffic flow with a notification field, where the number of packets to be marked is proportional to a size of the positive change in the amount of scheduled data in the traffic flow. Identifying a positive change may include comparing a number of packets sent in a traffic flow during a round-trip time (RTT) with a number of packets sent in a traffic flow during a prior RTT.

In an aspect of the present disclosure, a method is disclosed which includes receiving, by a network element, one or more packets, at least one packet of the one or more packets including a notification field. The method also includes identifying, by the network element, an increase in traffic based at least in part on the notification field, and activating, by the network element, a microburst mitigation mechanism in response to the increase in traffic. Identifying an increase in traffic can include the network element calculating a proportion of received packets of the one or more packets which include the notification field and determining the increase in traffic if the proportion of received packets is larger than a threshold value. The threshold value may be an adaptive threshold value based on an available memory storage in a buffer of the device. Activating a microburst mitigation mechanism can include the network element allocating a secondary buffer to store high priority packets received by the device and selectively storing one or more packets of the plurality of packets in the secondary buffer if each of the one or more packets include an indication that they are high priority packets. The indication may include a one-bit priority field in at least one packet of the one or more packets. The network element may be a switch. Each of the one or more packets may be associated with an egress port of the network element. The notification field may be a one-bit field.

According to another aspect, an apparatus is provided, where the apparatus includes a memory, configured to store a program; a processor, configured to execute the program stored in the memory, and when the program stored in the memory is executed, the processor is configured to perform one or more of the methods described herein.

In another aspect, a computer readable medium is provided, where the computer readable medium stores program code executed by a device, and the program code is used to perform one or more of the methods the described herein.

According to another aspect, a chip is provided, where the chip includes a processor and a data interface, and the processor reads, by using the data interface, an instruction stored in a memory, to perform one or more of the methods the described herein.

Embodiments have been described above in conjunction with aspects of the present invention upon which they can be implemented. Those skilled in the art will appreciate that embodiments may be implemented in conjunction with the aspect with which they are described but may also be implemented with other embodiments of that aspect. When embodiments are mutually exclusive, or are incompatible with each other, it will be apparent to those skilled in the art. Some embodiments may be described in relation to one aspect, but may also be applicable to other aspects, as will be apparent to those of skill in the art.

BRIEF DESCRIPTION OF THE FIGURES

Further features and advantages of the present invention will become apparent from the following detailed description, taken in combination with the appended drawings, in which.

It will be noted that throughout the appended drawings, like features are identified by like reference numerals.

DETAILED DESCRIPTION

Network events, and particularly microbursts, can significantly impact the performance and efficiency of data center networks (DCN). Congestion control (CC) algorithms can be designed to control long term congestion, such as congestion which is at least one round-trip time (RTT) long. However, microbursts are sub-RTT, and these short-term events may not be handled effectively by CC algorithms.

Microbursts are a very high packet rate in a very short period (below one RTT) which can happen in any link of the network. A microburst occurs when a large amount of burst data is received in a relatively short period of time. Microbursts can last for a sub-RTT, with an instantaneous burst data rate which can be tens or hundreds of times the average data rate or even exceed the port bandwidth. Microbursts can cause buffer overflow at switches for a short period of time.

Congestion notifications include implicit notifications such as detecting packet drops (e.g., tail drop, random early detection) and explicit notifications, such as explicit congestion notification (ECN), where switches explicitly inform traffic sources of network congestion. ECN algorithms are an important component of modern DCN congestion control systems, such as data center transmission control protocol (DCTCP) and data center quantized congestion notification (DCQCN).

CC algorithms may suffer during short-term events like microbursts due to incorrect congestion signaling. These systems generally rely on traffic information being communicated from a switch to the traffic source, such as in implicit or explicit indication of packet drops and/or network congestion. This information may lead to the traffic source decreasing its sending rate. However, this information may not return to the traffic source until after one RTT, while a microburst may already have ended in that period. Thus, the reaction of CC algorithms can magnify the impact of a microburst by adding a posterior impact, through unnecessarily reducing the sending rate in a traffic flow even after the network event has ended.

Figure 1:
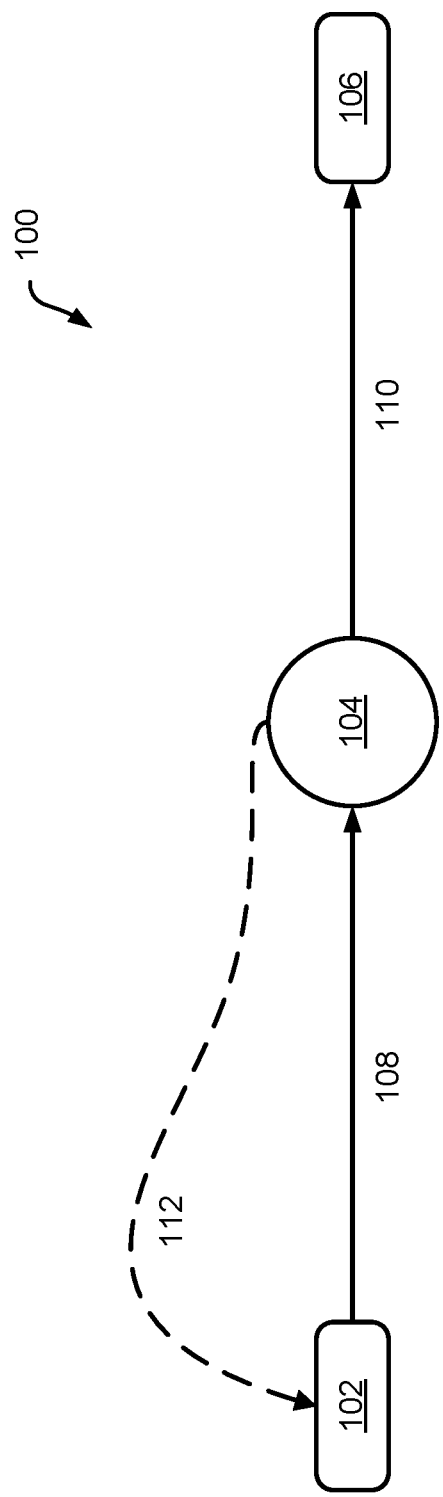
FIG. 1 is an illustration of data and notification flow during network congestion.

FIG. 1 is an illustration 100 of data and notification flow during network congestion. Generally, a source 102 (a traffic source or the sender of data, which may also be called a sending device) may wish to transmit packets (a traffic flow) to a device 106. The device 106, for example a network element, may be associated with an egress or output port of a switch 104. The source 102 may transmit 108 a packet to a switch 104, and the switch 104 may mark the packet and indirectly transmit 110 the information to the device 106. When there is a congestion event, such as a packet being dropped due to a buffer overflow in the output port of the switch 104, the switch 104 may transmit a notification 112 to the source 102. The notification 112 can alert the source 102 of the dropped packet(s), and the source 102 can take actions such as reducing its sending rate to the switch 104. Generally, both implicit and explicit congestion notification approaches include data flow from the switch 104 to the source 102.

However, this notification data flow may be too slow to react to a microburst. By their nature, a microburst is a sub-RTT event, while information from the switch 104 to the source 102 may take longer than the microburst lasts. Thus, this information will be too slow to prevent an initial buffer overflow due to the microburst, and it may arrive at the source 102 after it is already outdated.

Therefore, it may be beneficial to transmit congestion information in a more proactive manner, from a traffic source to switches, to allow for better network handling of microbursts and other short-term events. Using this intent cue (i-Cue) system and method, a traffic source may proactively determine changes in its traffic flows and mark packets to indicate both the change in their sending rate and the packets priorities. Switches may be configured to use these indications to identify network events, which may include microbursts, and to prevent dropping high priority packets during a microburst. This approach may help mitigate the immediate impact of a microburst, a buffer overflow and dropped packets, and may prevent the posterior effect of unnecessarily decreasing the sending rate of a traffic flow.

Figure 2:
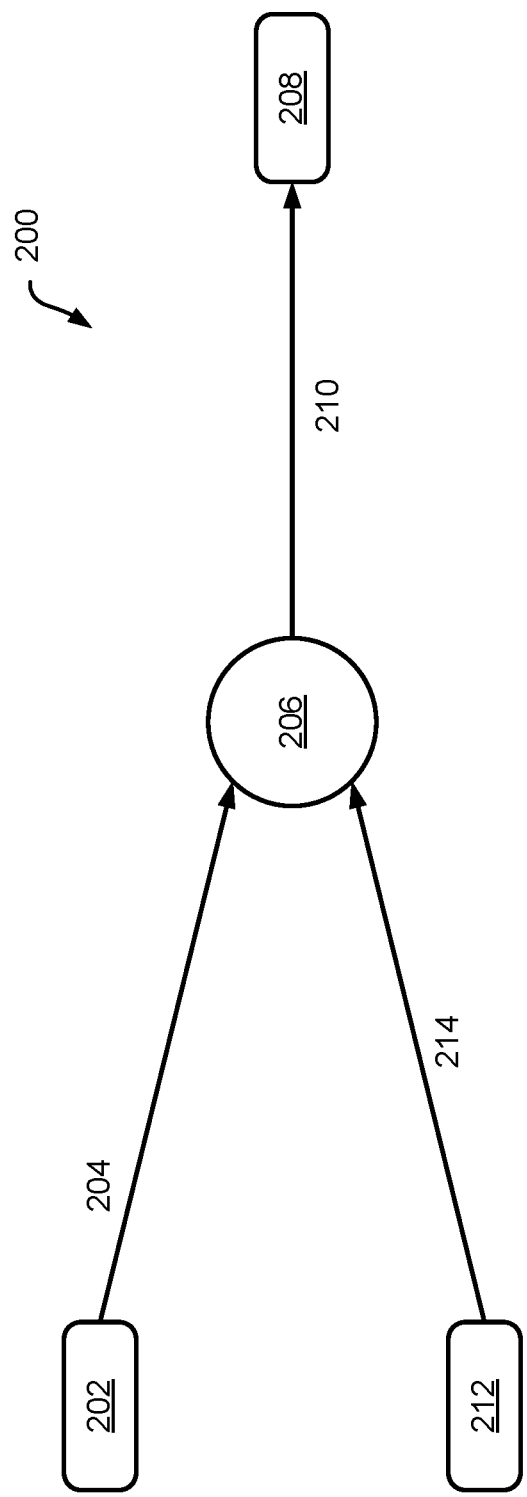
FIG. 2 is an illustration of data flow when using an intent cue system, according to an embodiment of the present disclosure.

FIG. 2 is an illustration 200 of data flow during network congestion when using an -i-Cue system, according to an embodiment of the present disclosure. The i-Cue system can help mitigate microbursts at a host-switch level. In this system, a traffic source 202 (or sending device) may transmit a traffic flow including a packet 204 to a switch 206. The packet 204 may ultimately be intended to be sent to a device 208 (or network element) associated with an egress port of the switch 206 in transmission 210. The source 202 may be configured to send traffic information to the switch 206. This traffic information can be included in the packet 204. The traffic information can include an indication of whether the source 202 is transmitting more data than usual to the device 208.

For example, the source 202 may determine that a traffic flow includes more data during an RTT than it included in a prior RTT. The source 202 may then include traffic information in some of the packets it is transmitting, such as marking some of the packets in the traffic flow during the RTT, to inform the switch 206 that the traffic flow includes more packets than in a prior RTT. The number of packets which are marked may be proportional to the increase in packets transmitted during the RTT. For example, if the source 202 is sending ten additional packets during this RTT compared to the prior RTT, it may be configured to mark the first ten packets transmitted in this RTT. The packets may be marked by including a one-bit notification field in the packets, with a value of true (1) indicating that the packet 204 is marked.

The traffic information included in the packets can also include an indication of priority, such as indicating whether the packet 204 is a high priority packet. The priority information may be included as a priority field in the packet 204, such as a one-bit priority field where a value of true (1) indicates that a packet is high priority. Larger priority fields, such as a two-bit priority field, may also be used when there are three or more different priority levels (e.g., low, normal, and high). The traffic information can also include other information, such as changes in sending rate between the source 206 and the device 208.

Similarly, another source 212 may also send a traffic flow including a packet 214 through the switch 206, intended for the device 208. As with packet 204, the packet 214 can include traffic information such as information about an increase in traffic and/or a priority indication of the packet 214. In this way, traffic information may flow the opposite direction as it did in illustration 100, with sources 202, 212 providing traffic information proactively to the switch 206, rather than traffic information only flowing from the switch 206 to the sources 202, 212. Providing traffic information proactively may allow the switch 206 to react to traffic events more quickly, such as allowing the switch 206 to infer the beginning of a microburst before packets are dropped. The traffic information can also allow the switch 206 to give priority to latency-sensitive packets, which may be marked as high priority, such as first RTT packets in credit-based algorithms and packets during fast phases. This traffic information may be configured to give the switch 206 clear vision of an upcoming microburst. This system may be implemented relatively easily, through an add-on module to the transport layer on sources 202, 212 and a pure data plane implementation on the switch 206.

In some embodiments, the system can include a change notification and priority determination (CNPD) module at a source, a reaction to these notifications at a switch, and a microburst mitigation mechanism at the switch. Each of these three mechanisms can be used with one another, or separately. For example, sources or sending devices may mark packets to show their priority and changes in transmissions during a current RTT, but other microburst mitigation techniques may be used at a switch in response to this information. The described system may be configured to be compatible with a wide range of congestion control algorithms.

According to embodiments, the CNPD module may be configured to identify an increase in traffic in a traffic flow to a switch, allowing the switch to determine whether it may be receiving a microburst. The CNPD module may be configured to notify a recipient device, such as a switch, of a change in the rate of transmissions. The CNPD module may use a threshold to determine when to mark packets, to minimize marked packets and to prevent overreactions to relatively small increases in traffic. The CNPD module may be configured to provide an adaptive notification to a recipient device such as a switch, where the notification is proportional to an amount of data sent. The CNPD module may also be configured to mark the priority of each packet, so that the switch can avoid dropping high priority packets. The CNPD module may be implemented at a source of a traffic flow, which can help provide more accurate information than solutions where switches are responsible to track all flow states. Positioning CNPD modules at traffic sources may also allow for more distributed computation among senders, better spreading the workload of reducing mitigation.

According to embodiments, a switch may be configured to be reactive to notifications received from traffic sources. A switch may be configured to identify potential microbursts based on notifications in changes of sending rates, in packets marked by a CNPD module. When a switch identifies a microburst, it can activate a microburst mitigation mechanism such as the microburst arrester module described herein. Switches may be configured to track a proportion of packets including a change notification (i.e., marked packets) on a per-egress port basis, rather than needing to track on a per-traffic flow basis. The switch may use an adaptive threshold to determine when to enable a microburst mitigation mechanism. These reactions may be implemented in the pure data plane pipeline to allow for rapid reactions, and the switch may be compatible with any microburst mitigation mechanism. This approach may require relatively fewer resources at the switch than other techniques for managing traffic and microbursts. Because a switch receives traffic information directly from traffic sources, the switch can proactively react to this information without needing to wait for the source side to, e.g., lower its sending rate. This may also minimize false alarms to traffic sources, which may otherwise be alerted to a microburst and only receive this alert after the microburst has passed.

According to embodiments, a microburst arrester (MBArrester) module is an example of a microburst mitigation mechanism which can be used by the switch. The MBArrester may also be used with other types of congestion control systems. The MBArrester seek to minimize the number of high priority packets which are dropped during a microburst or other network event. When the MBArrester is active, the switch may be configured to use a secondary buffer, such as a microburst buffer, which can be used to temporarily provide extra buffer for high priority packets to avoid dropping those packets during a microburst. The switch may also use a conventional buffer while the MBArrester is active, and this buffer may operate normally to store both high- and low-priority packets as normal. The secondary buffer may be used to store high-priority packets which would have otherwise been dropped, due to a full conventional buffer, during high traffic events such as microbursts. This may provide a highly scalable solution to microbursts with relatively low resources requirements on switches.

Figure 3:
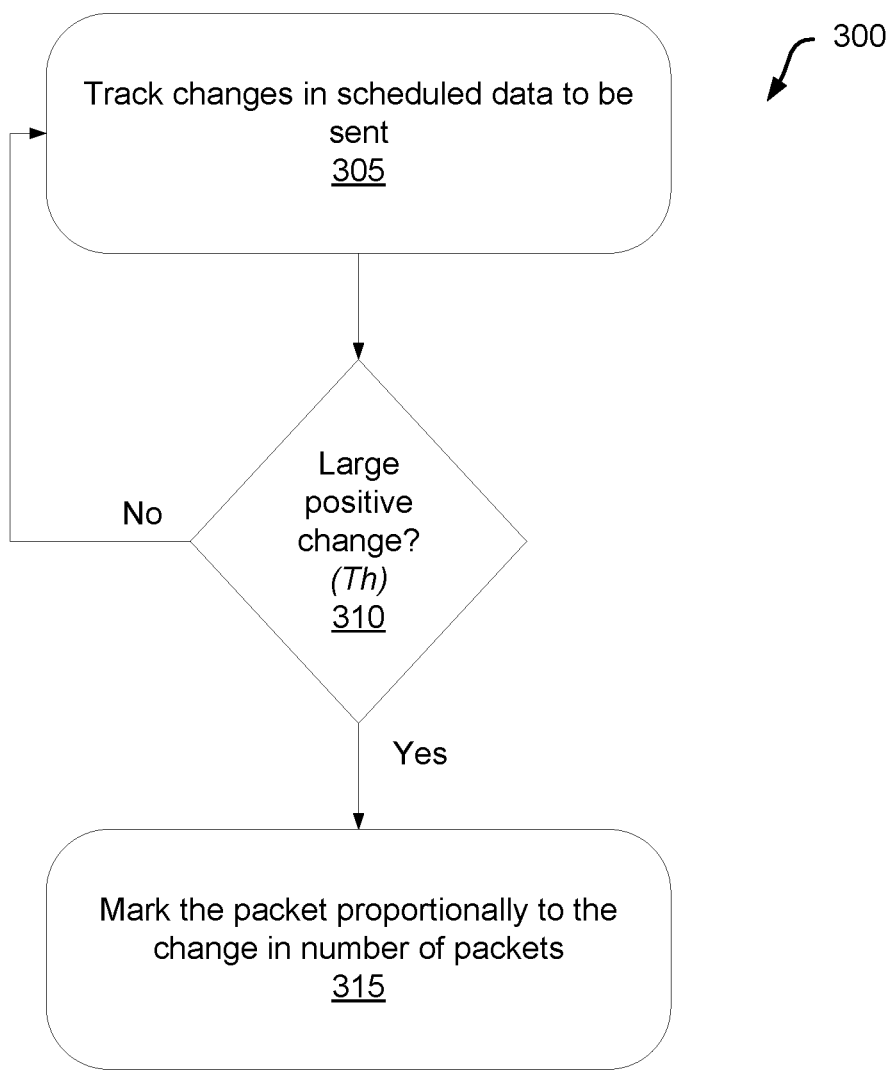
FIG. 3 is a flow chart illustrating the operation of a change detection and notification module at a traffic source, according to an embodiment of the present disclosure.

FIG. 3 is a flow chart 300 illustrating the operation of a change detection and notification module at a traffic source, according to an embodiment of the present disclosure. This change detection and notification module may be used by a sending host and may operate on a transport layer. The CNPD module may be configured to identify changes in traffic sending patterns and to mark packets when there are positive changes detected, to allow recipient devices to efficiently handle the increased traffic.

At block 305, a source tracks changes in scheduled data to be sent in a traffic flow. The source may be configured to track changes in scheduled data on a per-flow basis. The source (or traffic source or sending device) may compare the data scheduled to be sent in a traffic flow to a device in a period, such as during an RTT, to how much data was transmitted in that traffic flow in the past. For example, the traffic source may compare how many packets are being transmitted in the traffic flow during an RTT with how many packets were transmitted in the same traffic flow in the prior RTT.

At block 310, a source may observe a large positive change in scheduled data to be sent in the traffic flow. For example, the source may compare the packets transmitted in the traffic flow in a RTT with the packets transmitted to that device in a prior RTT. If there are more packets in the current period, such as if the number of packets is larger by a threshold amount (Th), the source may be configured to identify and react to this increase in traffic. This comparison may be based on an absolute increase in the number of packets transmitted (such as transmitting k more packets in an RTT) or based on a relative increase in the number of packets transmitted (such as transmitting, e.g., 20% more packets during an RTT).

At block 315, if the source observed a large positive change in scheduled data, the source may mark packets proportionally to the change in the number of packets. For example, if a current RTT includes k more packets than a prior RTT, the source may be configured to mark the first r×k packets of the current RTT, where r is a tuning/design parameter. For example, if the traffic flow from the source in the current RTT includes 10 more packets than the prior RTT, and if the value of r is set to 1, the source may mark the first 10 packets in the current RTT.

The marked packets can be marked both to indicate an increase in the number of packets being transmitted and can also include a priority indication showing the priority level of the packet. Generally, a microburst mitigation mechanism may seek to avoid dropping high-priority packets during a microburst. Therefore, these markings may be used to assist the switch in determining which packets cannot be dropped and which packets can be dropped. Priority markings on packets can be based on different optimization goals of the congestion control algorithm. For example, packets in a first RTT of a transmission may be marked as high priority to ensure they are not dropped.

Figure 4:
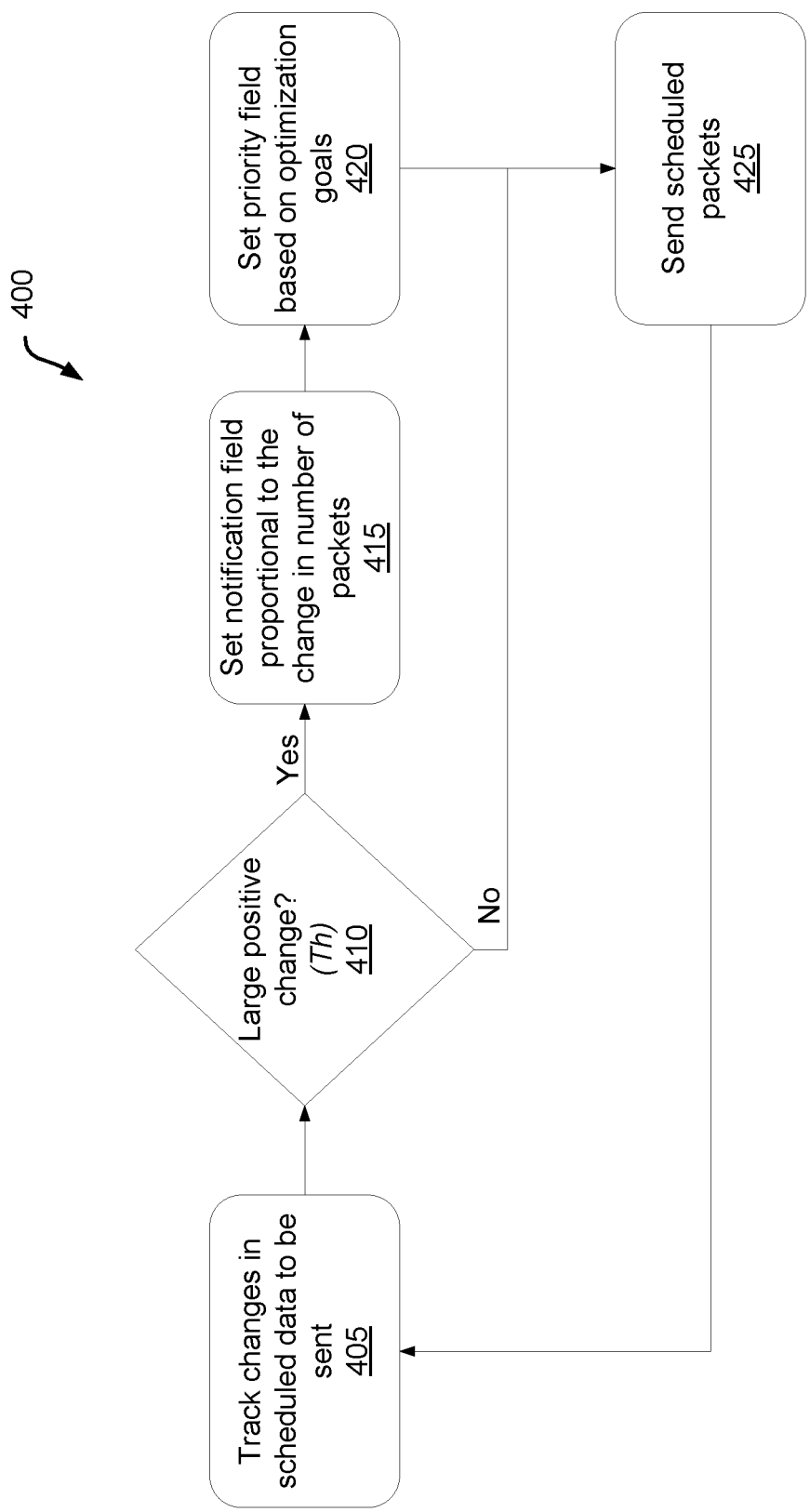
FIG. 4 is a flow chart illustrating a priority determination module and its relationship to the change detection and notification module, according to an embodiment of the present disclosure.

FIG. 4 is a flow chart 400 illustrating a priority determination module and its relationship to the change detection and notification module, according to an embodiment of the present disclosure. The CNPD module may be used by a source or sending device and may operate on a transport layer.

At block 405, a source tracks changes in scheduled data to be in a traffic flow. This tracking may allow the source to be able to recognize significant increases in the amount of data scheduled to be sent in the traffic flow. For example, the source may keep track of how many packets it transmits in the traffic flow to another device during each RTT and may compare this value to the number of packets sent in one or more past RTTs.

At block 410, the source determines whether there has been a large positive change in an amount of data scheduled to be sent in the traffic flow. This determination may be made by comparing the number of packets transmitted during two RTTs, and then determining whether the change is greater than a threshold value (Th).

If there has not been a large positive change, the source proceeds to block 425 and sends the scheduled packets as usual. In this scenario, since there has not been a large positive change in sending rates, there is no need to include an indication that more packets are being transmitted.

If there has been a large positive change in the scheduled data to be sent, at block 415, the source sets a notification field proportional to the change in the number of packets to be sent. In one aspect, the notification field may be a one-bit field that can be included in a packet, with the field indicating higher traffic. The notification field may be set in a number of packets proportional to the increase in the number of packets during the RTT or another applicable period.

At block 420, the source sets a priority field in a packet, which indicates the priority of the packet. A priority determination may be accomplished through collaboration between the transport protocol and congestion control algorithms. The priority field may be set according to different optimization goals of a particular system, such as goals of simplicity, minimizing false priority marking, and/or CC-based priority or quality of service (QoS)-based priority. For example, if simplicity is a goal, the notification and priority fields may be set to the same value. In such an approach, all packets at a first RTT (and the first RTT of each sending period in remote procedure call (RPC)-like connections) may be marked as high priority, with the system configured to try to deliver all first RTT packets and to give priority to short traffic flows. If minimizing false priority marking is a goal, the algorithm may use input directly from the transport protocol to identify high priority packets. This may allow the notification field (based on changes in sending rate) and the priority field to be set independently from one another. The priority field may be set based on the service, to respect all priorities enforced by CC and QoS mechanisms, keeping priority of flows untouched. If a goal is to minimize latency, the CC and transport protocols may be designed to send data as soon as it is available. In this scenario, the source may be configured to identify this change in rate and to mark these packets as high priority to minimize latency.

At block 425, the source sends the scheduled packets in the traffic flow. The packets may include the notification field and the priority fields described above if there was a large positive change in the scheduled traffic. The packets may be transmitted to a switch, which may be configured to use the marked packets to identify and react to microbursts in a proactive manner.

For example, simplicity in packet marking may be a goal of the system. In one aspect, a packet may contain a one-bit notification mark, and a one-bit priority field for high and normal priority. If the marking system is window-based, the system may set $$m_{wnd}(k) = \frac{cwnd(k+1) - cwnd(k)}{BDP} = \frac{r(k+1) - r(k)}{C},$$

where cwnd(k) is the congestion window size at the time sending $k^{th}$ packet, BDP denotes bandwidth-delay product, and sending rate at the time sending $k^{th}$ packet is designated by r(k). The system may also calculate $$m_{ack}(k) = \frac{seq(k+1) - seq(k)}{BDP},$$

where seq(k) denotes the last acknowledge sequence number at the time sending $k^{th}$ packet. The system may then calculate a maximum between $m_{wnd}(k)$ and $m_{ack}(k)$, and may then be configured to mark m packets, both with the notification mark and to mark them as high priority.

Alternatively, the CNPD module may aim to minimize false priority markings. For example, the module may be window-based and may include a one-bit notification mark and a two-bit priority field, for high, medium, and low priorities. The system may be configured to mark the same m packets with a notification mark as in the simplicity scenario. However, rather than also marking those packets as high priority, the system may instead determine the priority marking based on the congestion algorithm. For example, this may include marking packets as normal priority if changes happen at middle of a flow, marking packets as low priority if it is a first RTT and is used for probing, and otherwise marking packets as high priority.

Figure 5:
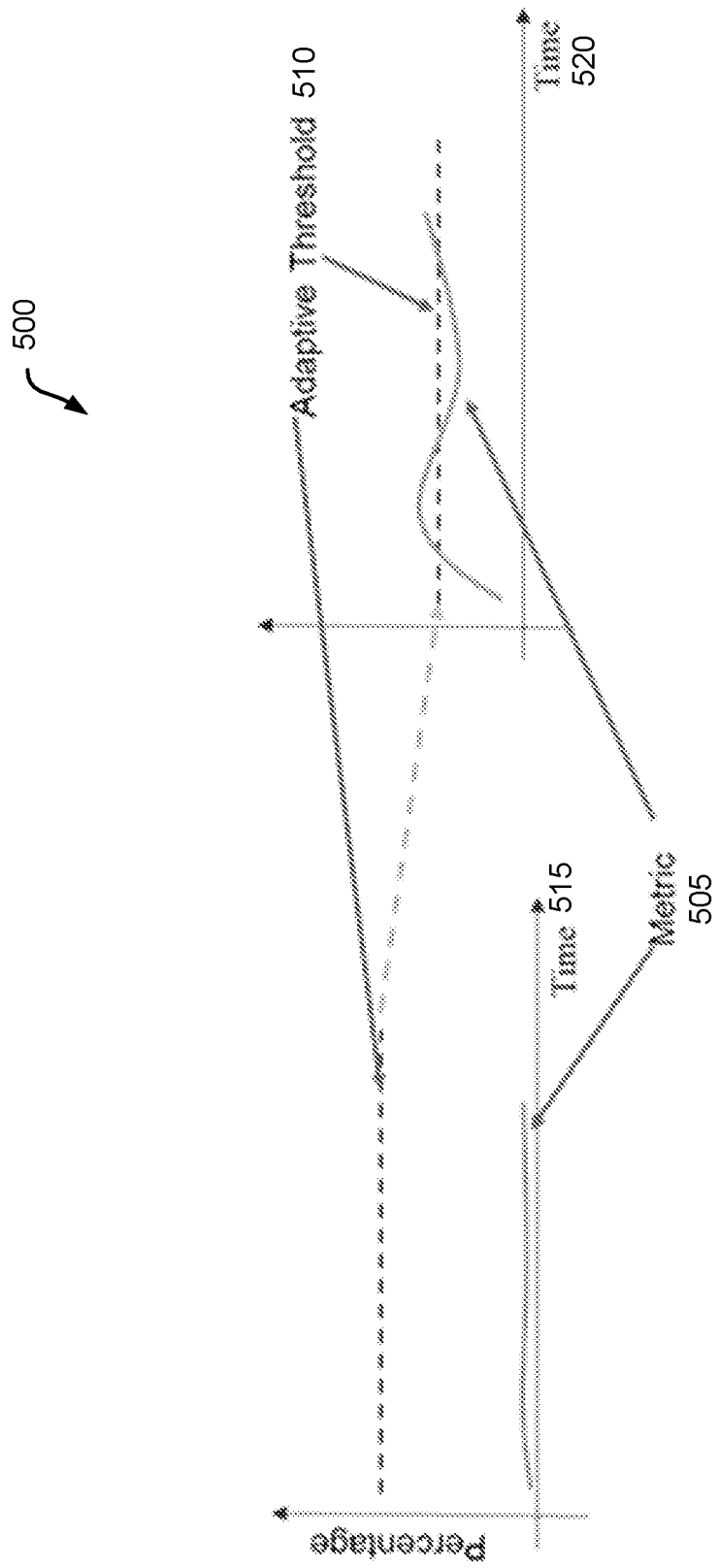
FIG. 5 is an illustration of a metric and an adaptive threshold which can be used to improve identification of a microburst, according to an embodiment of the present disclosure.

FIG. 5 is an illustration 500 of a metric 505 and an adaptive threshold 510 which can be used to identify a microburst, according to an embodiment of the present disclosure. A switch may be configured to track the metric 505 and the adaptive threshold 510 for each of its egress ports. The metric 505 may be a numeric representation of the amount of marked traffic directed towards a particular egress port or device, while the adaptive threshold 510 may be a numeric threshold which is used for comparison with the metric 505 to predict when a microburst is occurring for that egress port or device. When a microburst is detected, the switch may be configured to use a MBArrester module, which may be configured as a prioritized MBArrester. The switch may also be configured to use the metric 505 and the adaptive threshold 510 to determine when a microburst has ended. For example, the switch may be configured to identify the end of a microburst when the metric 505 drops to, e.g., 90% or 95% of the adaptive threshold 510. When the metric 505 drops sufficiently below the adaptive threshold 510, the switch may be configured to turn off its MBArrester module.

According to embodiments, one way to calculate the metric 505 may be to use a percentage of marked packets passing a given egress port to detect microbursts in the corresponding egress port. This metric 505 may be represented as m(t). For example, each egress port may be used to deliver packets to a client device. As described above, when a source determines that there is a significant increase in packets intended for a device, it may mark those packets to indicate the change in packets to that device and a priority of those packets. The switch may be configured to monitor how many packets in each egress port is marked, to assist in predicting microbursts. For example, the switch may use a register to track the last, e.g., 32 or 64 packets in an egress port, and may then be able to determine what percentage of those packets were marked to indicate higher traffic flow and to use this figure as the metric 505. Another potential way to calculate a metric may be to calculate a percentage of marked packets in a data plane pipeline.

According to embodiments, one way to calculate an adaptive threshold 510 may be to use an average percentage of available buffer in an egress port queue. The average percentage of available buffer may be computed for a period of time or as an average buffer during the last n arrived packets. Since this calculation may be done by the switch, the adaptive threshold 510 may be designed with the capabilities of the switch in mind, to ensure that the switch is easily able to calculate the adaptive threshold 510.

This adaptive threshold 510 may be represented as th(t). The available buffer percentage may be a good indication of background traffic. The adaptive threshold 510 may represent a maximum number of packets from a microburst that the buffer can absorb without filling up and dropping packets. When the available buffer is almost 100%, such as at time 515, the background traffic may be very low and so the switch may be able to handle relatively large spikes in traffic without needing to use a microburst mitigation mechanism, and without needing additional buffer to prevent dropping excess packets. Thus, in this scenario, the adaptive threshold 510 may be comparatively large and require a significant spike in traffic before engaging techniques to mitigate microbursts. However, if the available buffer is very low such as at time 520, even a small spike in traffic may result in dropped packets. Accordingly, at time 520 the adaptive threshold 510 may be set to be much lower, so that a much smaller increase in traffic and in the metric 505 may trigger a microburst mitigation mechanism module to prevent dropping high priority packets.

Generally, the metric 505 and the adaptive threshold 510 may be compared to one another to predict microbursts at a given egress port. For example, if $m(t) \geq \alpha th(t)$, the switch may determine that a microburst is about to start and may trigger the initiation of a microburst mitigation mechanism. In this formula, $\alpha \in [0,1]$ is a design parameter which can be tuned to determine how often the microburst mitigation mechanism may be triggered while th(t) may be the amount of available buffer memory as a percentage. A smaller value of a may result in reaction to smaller traffic spikes/smaller microbursts, which may lead to fewer packets being dropped. A higher value of a will react only to larger traffic spikes/larger microbursts but may decrease average latency as initiating a microburst mitigation mechanism itself may trigger some latency. If a microburst has already been detected, the switch may be further configured to use the formula $m(t) \leq h \times \alpha th(t)$ to determine when the microburst has concluded. In this formula, the parameter $h \in [0.9, 0.95]$ may be used to minimize the on-off behaviour in predicting microbursts when traffic is consistently otherwise near this threshold value. That is, the trigger to terminate the microburst mitigation mechanism may be 5 to 10% lower than the threshold to turn off the microburst mitigation mechanism, to provide a hysteresis behavior to minimize unnecessary initiation and termination of the microburst mitigation mechanism.

The metric 505 and the adaptive threshold 510 may provide a switch with a rapid reaction mechanism in the face of increasing traffic. For example, suppose that a traffic load is initially low but suddenly increases. When this occurs, since the rate of traffic increased, at least one sender must have increased its rate or at least one new sender must have started communications. In either case, the number of marked packets, which include a notification field, may increase since these additional packets may be marked. Thus, the metric 505 would increase as these packets arrive. On the other hand, since input traffic is increasing, the adaptive threshold 510 may simultaneously decrease, since the available buffer will decline with more packets pending. The opposite directionality of the metric 505 and the adaptive threshold 510 in this scenario may provide the switch with a particularly rapid reaction in the face of changing traffic conditions.

Figure 6:
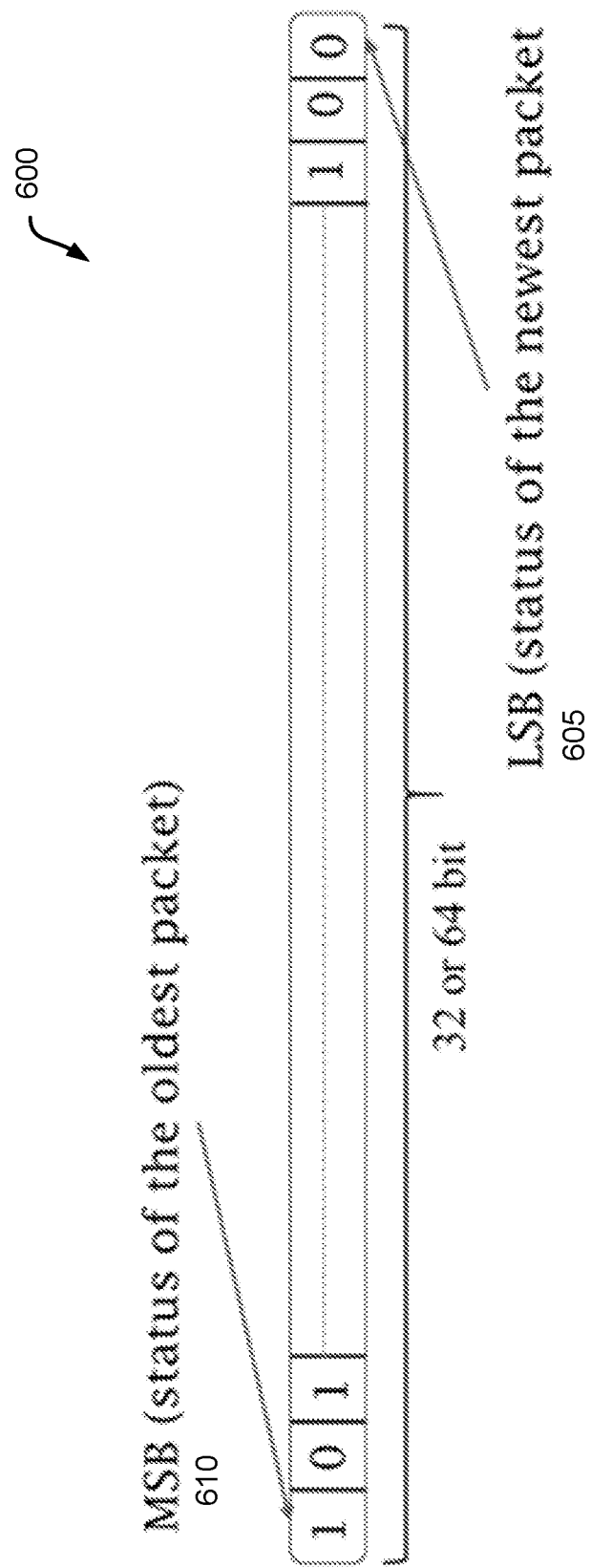
FIG. 6 is an illustration of a register which may be used on a switch to store the status of packets for a particular egress port, according to an embodiment of the present disclosure.

FIG. 6 is an illustration of a register 600 which may be used on a switch to store the status of packets for a particular egress port, according to an embodiment of the present disclosure. The register 600 may be used to track how many recent packets for a given egress port were marked to show an increase in traffic. This may be used to calculate a metric, which may be compared to a threshold to identify a microburst. The register 600 in the illustration may be implemented in a data-plane layer, such as being implemented on available software-defined switches.

Generally, the metric m(t) may be based on a percentage of recent packets which are marked. An average number of marked packets may be calculated using either a time-based average or a counter-based approach. When using a time-based average, the switch may consider packets received during a period of time, calculating a proportion of packets during the period which were marked. Alternatively, the switch may include a register which includes indications for the past n packets and calculate a percentage of marked packets based on this register. In practice, using a time-based percentage may have advantages but may also be more computationally difficult. For example, some implementations of a time-based percentage may require that switches include a timer, which may not be included on many switches. A time-based percentage may also require the selection of a period which is appropriate for a given level of traffic. That is, a switch which receives more traffic may need to select a shorter period to be more reactive to changes in traffic.

Due to the potential drawbacks of a time-based average, a switch may instead use a counter-based approach, which can be more efficient. For example, the register 600 may be configured to be a set size, such as a 32-bit register, and to reflect the number of marked packets of the last, e.g., 32 packets. The register 600 may also be other sizes. A register 600 may be assigned for each egress port and may be used to indicate whether the last, e.g., 32 packets were marked or not. The register 600 may use a single bit to indicate whether each packet was marked. A switch may be configured to use one register 600 for each port.

As illustrated, the least significant bit 605 of the register may be used to show the marked status of the most recent packet for the given egress port, while the most significant bit 610 may be used to show the marked status of the oldest packet for the given egress port. A "1" may be used to indicate that the packet was marked while a "0" may indicate that the packet was not marked. When a new packet is received, the switch may be configured to remove the indication for the oldest packet, the most significant bit 610, shift bits in the register to the left, and store an indication for the new packet as the least significant bit 605.

The switch may also be configured to calculate a marked percentage based on the formula $$\frac{Cnt}{\ell_r},$$

where Cnt is the count of true bits in the register 600, and $\ell$ is the number of bits of register (e.g., 32 bits). As described, when each new packet arrives, the marked packet percentage of the corresponding port may be updated. This marked percentage may be used as the metric to determine when a given egress port is experiencing a microburst. It may be computationally easy to calculate a metric using such a fixed-size register 600, which may allow a switch to monitor traffic levels for each of its egress ports relatively easily.

The switch may be configured to compare the metric with the adaptive threshold, to determine whether to initiate and to turn off a microburst mitigation mechanism. A microburst arrester is one microburst mitigation mechanism which may be used.

Figure 7:
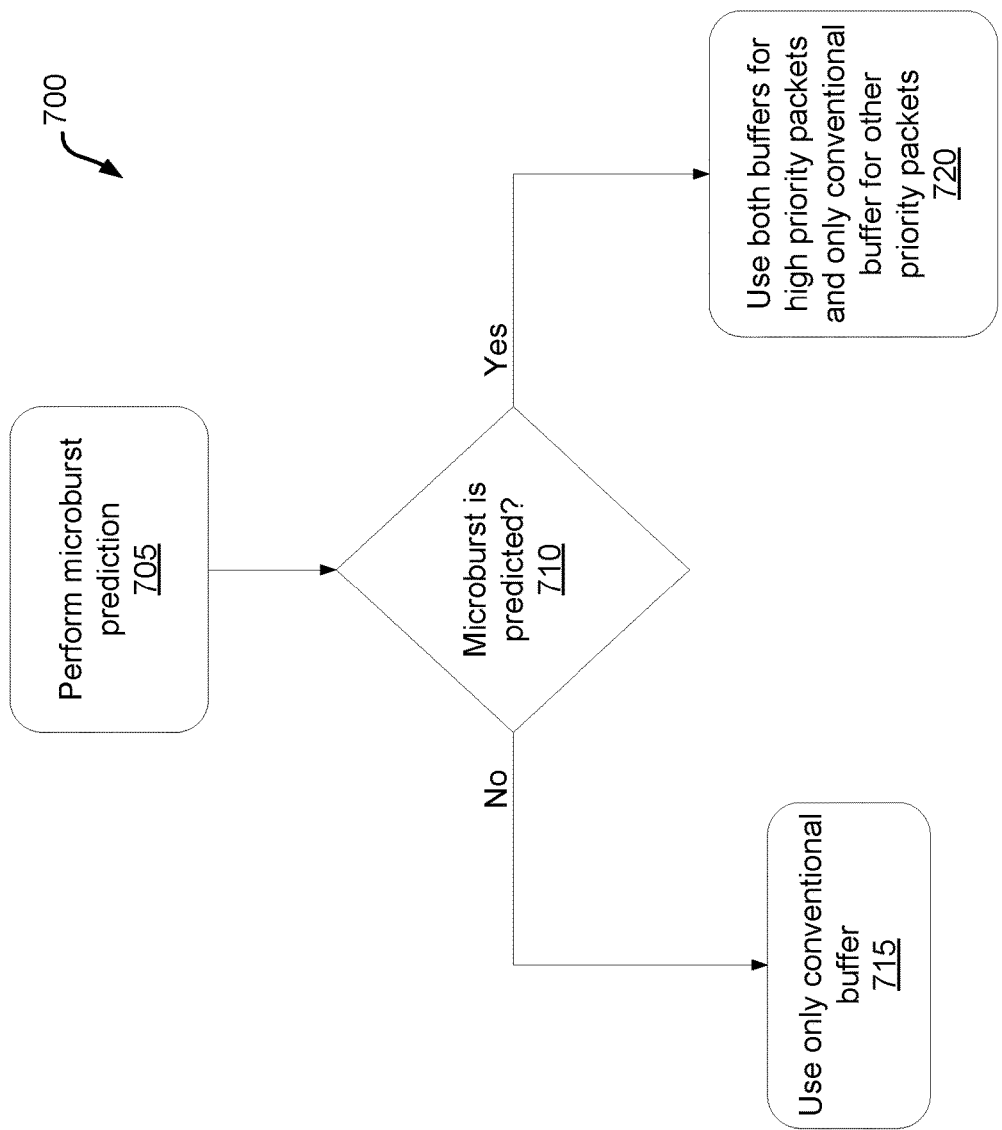
FIG. 7 illustrates the use of a microburst arrester with a conventional buffer memory and a microburst buffer memory, according to an embodiment of the present disclosure.

FIG. 7 illustrates 700 the use of a MBArrester with a conventional buffer memory and a microburst buffer memory, according to an embodiment of the present disclosure. The MBArrester may be used by a switch in a network. The MBArrester includes a conventional buffer memory and a secondary buffer or microburst buffer which can be enabled when a microburst is detected. The MBArrester may be comparable to a water-hammer arrester (WHA) that can be used to mitigate pressure surges in fluid (e.g. water) pipes. In fluid pipes, a WHA may use an extra space to absorb the fluid shock wave. In a similar manner, the MBArrester uses an extra buffer to absorb data traffic spikes.

At block 705, the switch may predict a microburst. This prediction may be done using any mechanism, including the mechanisms described above. For example, this prediction may be based on a number of marked packets in a buffer being above an adaptive threshold. The prediction here can also include determining when to turn off the MBArrester, such as when the number of marked packets falls below a threshold. The threshold to turn off the MBArrester can be below the threshold to turn on the MBArrester, to prevent repeatedly turning on and off the MBArrester.

If a microburst is not observed (in block 710), at block 715, the switch may operate in a conventional manner and may use its conventional buffer memory to store the outgoing packets until they are transmitted. As in usual operation, the switch may be configured to store all packets, regardless of their priority level, in the conventional buffer for the egress port and to transmit them normally.

However, if a microburst is observed (in block 710), at block 720, the switch may use the conventional buffer to store all packets and the microburst buffer to store only high priority packets. A microburst may fill the conventional buffer, which can result in excess packets being dropped. The MBArrester may therefore prioritize high priority packets by allocating a separate microburst buffer to be used only for those packets to prevent dropped high priority packets during a microburst. Thus, while the MBArrester is activated, once the conventional buffer is full the switch may be configured to allow lower priority packets to be dropped while ensuring that high priority packets are not dropped by using the microburst buffer.

According to embodiments, when a microburst buffer is provided, an adaptive threshold may be used which does not include the microburst buffer in its calculated threshold. For example, the adaptive threshold may still be based on the average percentage of available buffer, and this may only include the average percentage of available conventional buffer, without include the microburst buffer that can be used during a MBArrester procedure. That is, the adaptive threshold may be configured to be based on when the conventional buffer may be filled, and to engage a secondary buffer for high priority packets on those occasions.

Figure 8:
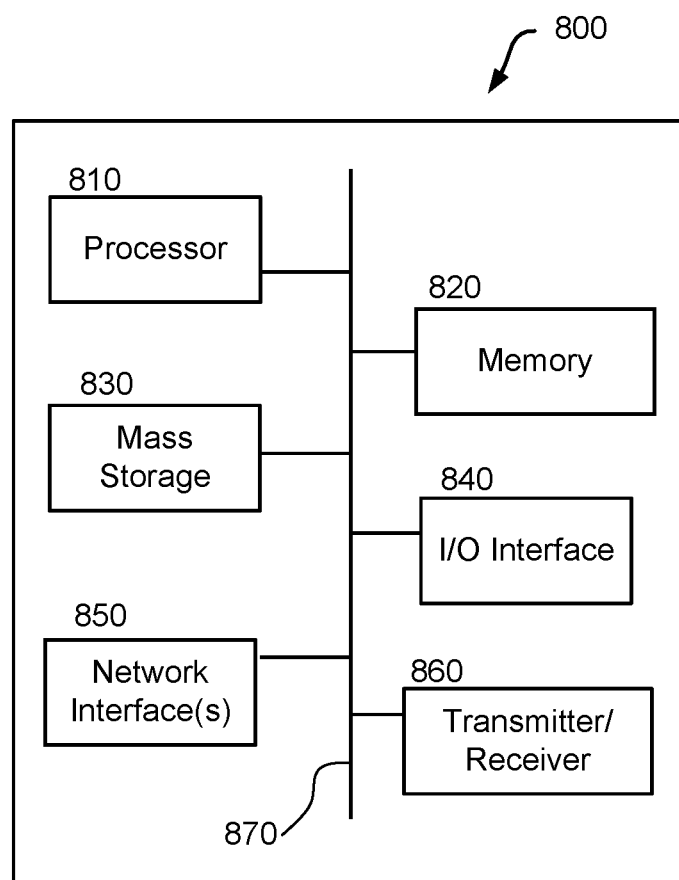
FIG. 8 is a schematic diagram of an electronic device that may perform any or all of the operations of the above methods and features explicitly or implicitly described herein, according to different embodiments of the present disclosure.

FIG. 8 is a schematic diagram of an electronic device 800 that may perform any or all of operations of the above methods and features explicitly or implicitly described herein, according to different embodiments of the present disclosure. For example, a computer equipped with network function may be configured as electronic device 800. In some embodiments, the electronic device 800 may be a host, sending device, a network device, a switch, user equipment (UE), an AP, a STA or the like as would be appreciated by a person skilled in the art.

As shown, the electronic device 800 may include a processor 810, such as a central processing unit (CPU) or specialized processors such as an application-specific integrated circuit (ASIC) processors or other such processor unit, memory 820, non-transitory mass storage 830, input-output interface 840, network interface 850, and a transceiver/receiver 860, all of which are communicatively coupled via bi-directional bus 870. According to certain embodiments, any or all of the depicted elements may be utilized, or only a subset of the elements. Further, electronic device 800 may contain multiple instances of certain elements, such as multiple processors, memories, or transceivers. Also, elements of the hardware device may be directly coupled to other elements without the bi-directional bus. Additionally, or alternatively to a processor and memory, other electronics, such as integrated circuits, may be employed for performing the required logical operations.

The memory 820 may include any type of non-transitory memory such as static random-access memory (SRAM), dynamic random-access memory (DRAM), synchronous DRAM (SDRAM), read-only memory (ROM), any combination of such, or the like. The mass storage element 830 may include any type of non-transitory storage device, such as a solid-state drive, hard disk drive, a magnetic disk drive, an optical disk drive, USB drive, or any computer program product configured to store data and machine executable program code. According to certain embodiments, the memory 820 or mass storage 830 may have recorded thereon statements and instructions executable by the processor 810 for performing any of the method operations described above.

Embodiments of the present disclosure can be implemented using electronics hardware, software, or a combination thereof. In some embodiments, the disclosure is implemented by one or multiple computer processors executing program instructions stored in memory. In some embodiments, the disclosure is implemented partially or fully in hardware, for example using one or more field programmable gate arrays (FPGAs) or ASICs to rapidly perform processing operations.

It will be appreciated that, although specific embodiments of the technology have been described herein for purposes of illustration, various modifications may be made without departing from the scope of the technology. In particular, it is within the scope of the technology to provide a computer program product or program element, or a program storage or memory device such as a magnetic or optical wire, tape or disc, or the like, for storing signals readable by a machine, for controlling the operation of a computer according to the method of the technology and/or to structure some or all of its components in accordance with the system of the technology.

Acts associated with the method described herein can be implemented as coded instructions in a computer program product. In other words, the computer program product is a computer-readable medium upon which software code is recorded to execute the method when the computer program product is loaded into memory and executed on the microprocessor of the wireless communication device.

Further, each operation of the method may be executed on any computing device, such as a personal computer, server, personal digital assistant (PDA), or the like and pursuant to one or more, or a part of one or more, program elements, modules or objects generated from any programming language, such as P4, C++, Java, or the like. In addition, each operation, or a file or object or the like implementing each said operation, may be executed by special purpose hardware or a circuit module designed for that purpose.

Through the descriptions of the preceding embodiments, the present disclosure may be implemented by using hardware only or by using software and a necessary universal hardware platform. Based on such understandings, the technical solution of the present disclosure may be embodied in the form of a software product. The software product may be stored in a non-volatile or non-transitory storage medium, which can be a for example a flash memory or a removable hard disk. The software product includes a number of instructions that enable a computer device (personal computer, server, or network device) to execute the methods provided in the embodiments of the present disclosure. For example, such an execution may correspond to a simulation of the logical operations as described herein. The software product may additionally or alternatively include a number of instructions that enable a computer device to execute operations for configuring or programming a digital logic apparatus in accordance with embodiments of the present disclosure.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations, or equivalents that fall within the scope of the present invention.

What is claimed is:

1. A method comprising:
   receiving, from a source, by a network element, one or more packets, at least one packet of the one or more packets including a marked notification field, the marked notification field indicative of a change in sending rate between the source and the network element as determined by the source;
   identifying, by the network element, an increase in traffic based at least in part on the at least one packet including the marked notification field; and
   upon identification of the increase in traffic, activating, by the network element, a microburst mitigation mechanism in response to the increase in traffic, wherein the network element is configured to infer a beginning of a microburst based on the marked notification field and proactively react to mitigate network congestion.

2. The method of claim 1, wherein identifying the increase in traffic includes:
   calculating, by the network element, a proportion of received packets of the one or more packets which includes the marked notification field; and
   determining, by the network element, the increase in traffic if the proportion of received packets is larger than a threshold value.

3. The method of claim 2, wherein the threshold value is an adaptive threshold value based on an available memory storage in a buffer of the network element.

4. The method of claim 1, wherein activating the microburst mitigation mechanism comprises:
   allocating, by the network element, a secondary buffer to store high priority packets received by the network element; and
   selectively storing, by the network element, a set of packets of the one or more packets in the secondary buffer if each packet of the set of packets includes an indication that said each packet of the set of packets is a high priority packet.

5. The method of claim 4, wherein the indication comprises a one-bit priority field in each packet of the set of packets of the one or more packets.

6. The method of claim 1, wherein the network element comprises a switch.

7. The method of claim 1, wherein each of the one or more packets is associated with an egress port of the network element.

8. The method of claim 1, wherein the marked notification field comprises a one-bit notification field.

9. The method of claim 1, wherein identifying includes identifying, by the network element, an amount of increase in traffic based on the at least one packet including the marked notification field, the marked notification field marked by a traffic source, and wherein activating the microburst mitigation mechanism occurs upon identification of the amount of increase in traffic is above a threshold.

10. The method of claim 1, wherein identifying the increase in traffic based at least in part on the at least one packet including the marked notification field includes determining, by the network element, the increase in traffic during a period of time.

11. The method of claim 1, wherein identifying an increase in traffic based at least in part on the at least one packet including the marked notification field includes determining, by the network element, a percentage of the at least one packet including the marked notification field based on a past n packets.

12. An apparatus comprising:
   at least one processor and at least one non-transitory machine-readable medium storing executable instructions which when executed by the at least one processor configure the apparatus to:
      receive, from a source, one or more packets, at least one packet of the one or more packets including a marked notification field, the marked notification field indicative of a change in sending rate between the source and the apparatus as determined by the source;
      identify an increase in traffic based at least in part on the at least one packet including the marked notification field; and
      upon identification of the increase in traffic, activate a microburst mitigation mechanism in response to the increase in traffic,
   wherein the apparatus is configured to infer a beginning of a microburst based on the marked notification field and proactively react to mitigate network congestion.

13. The apparatus of claim 12, wherein identifying the increase in traffic includes:
   calculating a proportion of received packets of the one or more packets which includes the marked notification field; and
   determining the increase in traffic if the proportion of received packets is larger than a threshold value.

14. The apparatus of claim 13, wherein the threshold value is an adaptive threshold value based on an available memory storage in a buffer of the apparatus.

15. The apparatus of claim 12, wherein activating the microburst mitigation mechanism comprises:
   allocating a secondary buffer to store high priority packets received by the apparatus; and
   selectively storing a set of packets of the one or more packets in the secondary buffer if each packet of the set of packets includes an indication that said each packet of the set of packets is a high priority packet.

16. The apparatus of claim 12, wherein the apparatus comprises a switch.

17. The apparatus of claim 12, wherein identifying includes identifying an amount of increase in traffic based on the at least one packet including the marked notification field, the marked notification field marked by a traffic source, and wherein activating the microburst mitigation mechanism occurs upon identification of the amount of increase in traffic is above a threshold.

18. The apparatus of claim 12, wherein identifying the increase in traffic based at least in part on the at least one packet including the marked notification field includes determining the increase in traffic during a period of time.

19. The apparatus of claim 12, wherein identifying an increase in traffic based at least in part on the at least one packet including the marked notification field includes determining a percentage of the at least one packet including the marked notification field based on a past n packets.

* * * * *

UNITED STATES PATENT AND TRADEMARK OFFICE
CERTIFICATE OF CORRECTION

| | | |
|---|---|---|
| PATENT NO. | : 12,388,752 B2 | Page 1 of 1 |
| APPLICATION NO. | : 17/727373 | |
| DATED | : August 12, 2025 | |
| INVENTOR(S) | : Amir Baniamerian et al. | |

It is certified that error appears in the above-identified patent and that said Letters Patent is hereby corrected as shown below:

In the Specification

Column 11, Line 57, "$\ell$ is the number of bits of register (e.g., 32 bits). As" should read -- $\ell_r$ is the number of bits of register (e.g., 32 bits). As --.

Signed and Sealed this
Seventh Day of October, 2025

John A. Squires
*Director of the United States Patent and Trademark Office*